(12) United States Patent
Cavaglia

(10) Patent No.: US 8,293,850 B2
(45) Date of Patent: Oct. 23, 2012

(54) CONTINUOUS PROCESS FOR SOLID PHASE POLYMERISATION OF POLYESTERS

(75) Inventor: Giuliano Cavaglia, Pessione Fraz. di Chieri (IT)

(73) Assignee: Cobarr S.p.A., Tortona, Alessandria (IT)

( * ) Notice: Subject to any disclaimer, the term of this patent is extended or adjusted under 35 U.S.C. 154(b) by 1910 days.

(21) Appl. No.: 10/523,650

(22) PCT Filed: Jul. 3, 2003

(86) PCT No.: PCT/EP03/07116
§ 371 (c)(1),
(2), (4) Date: Feb. 4, 2005

(87) PCT Pub. No.: WO2004/018541
PCT Pub. Date: Mar. 4, 2004

(65) Prior Publication Data
US 2005/0272906 A1    Dec. 8, 2005

(51) Int. Cl.
*C08L 67/03* (2006.01)
(52) U.S. Cl. ....... 525/488; 528/272; 528/274; 528/480; 528/492; 525/418; 525/434; 525/437
(58) Field of Classification Search ........... 528/274, 528/272, 502, 503, 492, 480; 525/418, 434, 525/437, 488
See application file for complete search history.

(56) References Cited

U.S. PATENT DOCUMENTS

| | | | |
|---|---|---|---|
| 3,075,952 A * | 1/1963 | Coover, Jr. et al. | 528/279 |
| 3,220,804 A | 11/1965 | Bachmann et al. | |
| 3,443,909 A | 5/1969 | Goossens | |
| 3,497,477 A * | 2/1970 | Barkey et al. | 526/83 |
| 3,767,601 A | 10/1973 | Knox | |
| 3,953,404 A | 4/1976 | Borman | |
| 4,276,261 A | 6/1981 | Kerscher et al. | |
| 4,370,302 A | 1/1983 | Suzuoka et al. | |
| 4,644,049 A * | 2/1987 | Tung et al. | 528/272 |
| 4,849,497 A * | 7/1989 | Scannapieco | 528/272 |
| 4,876,326 A * | 10/1989 | Rinehart | 528/272 |
| 5,362,844 A * | 11/1994 | Kerpes et al. | 528/308.5 |
| 5,408,035 A | 4/1995 | Duh | |
| 5,409,983 A * | 4/1995 | Jones et al. | 524/439 |
| 5,449,701 A * | 9/1995 | Duh | 521/182 |
| 5,711,089 A | 1/1998 | Pikus | |

FOREIGN PATENT DOCUMENTS

| | | |
|---|---|---|
| CH | A-260 294 | 11/1947 |
| DE | C-34 42 058 | 11/1984 |
| EP | 0 419 400 A2 | 3/1991 |
| EP | 0 953 589 A2 | 11/1999 |
| EP | A-1 247 563 | 9/2002 |
| GB | 1190801 * | 5/1970 |
| GB | A-1 317 061 | 5/1973 |

OTHER PUBLICATIONS

Notification of Transmittal of the International Preliminary Report on Patentability for PCT/EP2008/051406, Filed Internationally Feb. 5, 2008, Priority date Feb. 6, 2007.

* cited by examiner

*Primary Examiner* — Gregory Listvoyb
(74) *Attorney, Agent, or Firm* — Bacon & Thomas, PLLC

(57) ABSTRACT

A process for the solid phase continuous polymerization of polyester in order to achieve a molecular weight increase, measurable by the intrinsic viscosity IV increase of the polyester, wherein the use of at least a reactor (15) is provided, the reactor (15) being cylindrical, rotary around its own central axis (S), substantially horizontal, slightly inclined so as to produce the polymerization of the polyester granules passing through the reactor by gravity thanks to the inclination and the rotation of the reactor (15), inside the reactor there being produced a purge gas flow having the same or the opposite direction with respect to the flow of the polyester granules.

40 Claims, 1 Drawing Sheet

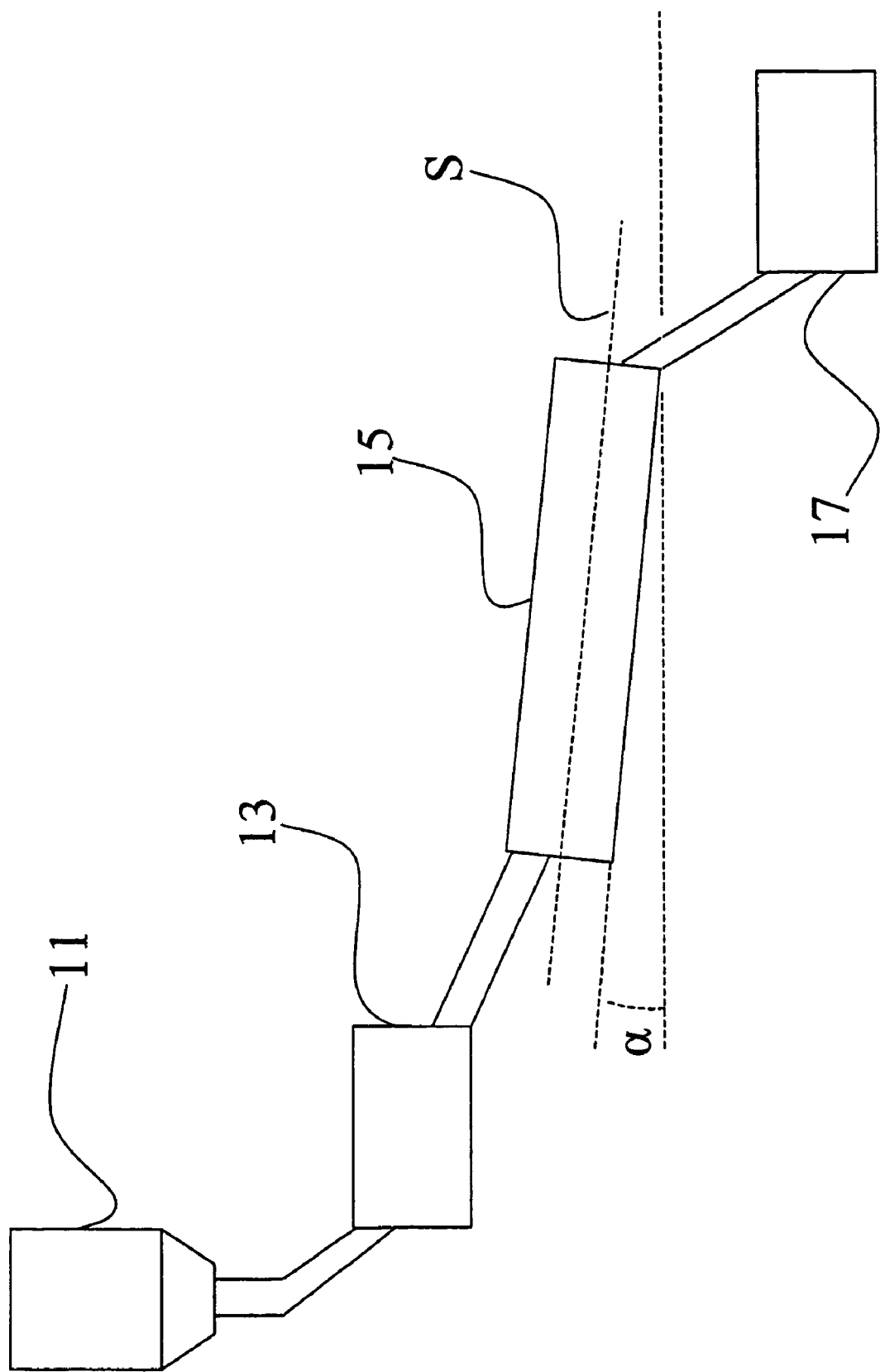

CONTINUOUS PROCESS FOR SOLID PHASE POLYMERISATION OF POLYESTERS

BACKGROUND

A. Field

The invention relates to a process for the solid phase continuous polymerisation of polyester. More exactly, the invention relates to a process for the solid phase continuous polymerisation of polyester in order to increase its molecular weight.

B. Related Art

It is known that the molecular weight of a polyester can be measured by the measure of its intrinsic viscosity IV ("Intrinsic Viscosity").

It is also known that the molecular weight increase of a polyester can be achieved by subjecting low molecular weight polyesters, generally in granules or chips form, to a solid phase polymerisation process that can be carried out in a continuous moving-bed or in a static-bed (so called because the polymer bed is not fluidised).

Moving-bed or static-bed solid-phase polymerisation processes, particularly intended for the polyethylene terephthalate, wherein temperatures comprised in the range 180-245° C. are applied, are known, for instance, from U.S. Pat. No. 3,405,098, U.S. Pat. No. 4,064,112, U.S. Pat. No. 4,161,578, U.S. Pat. No. 4,223,128, U.S. Pat. No. 4,238,593, U.S. Pat. No. 5,408,035, U.S. Pat. No. 5,536,810, U.S. Pat. No. 5,590,479, U.S. Pat. No. 5,708,124 and EP 0,222,714.

According to the teaching of the above mentioned documents, the solid phase polymerisation is preceded by a crystallisation step that can be performed at a lower temperature (see, for instance, U.S. Pat. No. 3,405,098, U.S. Pat. No. 4,161,578 and U.S. Pat. No. 4,223,128), at the same temperature (see, for instance, EP 222,714) or at a higher temperature (see, for instance, U.S. Pat. No. 4,064,112) with respect to that applied in the following polymerisation thermal treatment.

The purpose of the crystallisation step prior to the solid phase polymerisation is to prevent the sticking of the granules during the polymerisation process, especially at the highest temperatures.

As a matter of fact, it is known that in industrial solid-phase polymerisation plants sticking phenomena and solid agglomeration of the polyester granules happen frequently.

This problem is particularly evident when the polyester used as raw material in the polymerisation plant is substituted with a different polyester having different needs for the molecular weight increase. This happens for example during solid phase continuous moving-bed polymerisation in producing PET for beverage bottles where polymerisation is carried out at temperatures above the amorphous polyester (prepolymer) glass transition temperature, but below the melting point.

If we analyse all conventional solid phase polymerisation processes available today, it will result that the polyester prepolymer (crystallized or partially crystallized) is fed into the top of a vertical moving or static bed reactor for solid phase polymerisation in which it moves down by gravity in contact with a stream of preheated purge gas.

According to known prior art, the purge gas primarily functions to carry off unwanted by-products such as glycols, water and acetaldehyde, which are generated during polymerisation, while the polyester gradually moves towards the bottom of the vertical reactor.

In general, there are three important requisites that are to be met for correct operation of a continuous solid phase polymerisation process.

First, a steady uninterrupted flow of polymer granules must be maintained. As a consequence, it is highly important that agglomeration or sticking of polymer granules be avoided because they would impede the smooth flow of granules and make discharge of the product from the reactor difficult, thereby causing the plant control losing.

Secondly, a suitable combination of reactor residence time and temperature of granules is required to achieve the desired molecular weight, which is measurable, as indicated above, in terms of its intrinsic viscosity ("IV"). Since reaction rate increases with increasing temperature, and IV increases with increasing residence time, desired IV can be attained either by using relatively long residence time with relatively low temperature or relatively short residence time with relatively high temperature. However, the ideal combination of reactor residence time and temperature must be chosen taking into account the first of the requisites indicated above, i.e. the need to maintain a constant flow of polyester granules, thereby avoiding lumping or sticking of granules.

Third, the flow regime of polyester granules under processing inside solid-phase polymerisation reactor, must be as close as possible to the ideal "plug flow" behaviour, in a way that all polyester granules passing through the reactor experience the same process conditions for the same time duration, giving as a consequence narrow molecular weight distribution in the obtained product, and more generally narrow distribution of polymerised granules final attributes, which is a key factor for the correct realisation of the following steps in processing product with increased molecular weight.

As regards the first requisite, that is the need to avoid the sticking of the polyester granules, it is to be said that this phenomenon is mainly affected by temperature, granules size, bed height, velocity of flow of granules within the reactor and polyester-morphology.

The polyester granules, initially moving freely in a moving bed can stick and clot if, for instance, temperature or bed height increase or if rate decreases.

At solid phase polymerisation conditions, polyester is only partially crystalline (typically with 25 to 65% crystallinity). As a consequence, such polyester is not a rigid body, but rather, it is leathery and slightly tacky.

Since tackiness of polymer increases with increasing temperature, the sticking tendency of polyester granules also increases with increasing temperature.

Consider a fixed bed of polyester granules held motionless inside a solid state polymerisation vertical, cylindrical reactor: on these conditions at polymerisation temperatures and under pressure due to the weight of the polyester bed, granules to be polymerised, creep into one another at contact points and, in time, polymer granules will tend to agglomerate and form larger lumps.

The most effective way to prevent lumping is to constantly renew the inter-granular contact areas so that polymer granules do not have a chance to creep into one another. This is done by maintaining constant flow of polymer granules at sufficiently high velocity.

Since sticking tendency increases with increasing specific surface area (area per unit mass) or, more precisely, with increasing specific contact area of polymer granules, it also increases with decreasing size of polymer granules.

A reduced granules size contributes to accelerate the polymerisation process, on the other hand, however this increases the sticking tendency of polymer granules. In the presence of small size granules it is therefore required to counteract the higher sticking tendency with a reduction in temperature, which, on the other hand, brings the final values of the process rate back to the typical ones for larger size granules processed at a higher temperature.

Furthermore, if the particle size is reduced below certain limits, agglomeration occurs practically at any temperature. Typically that suitable size of polymer granules for solid state polymerisation is between 0.015 to 0.055 grams per granule.

Within a static or moving bed, the compaction pressure a polymer granule can experience is approximately proportional to the weight of the polymer granules in the bed which, in turn, is proportional to the bed height above the granules. Therefore polymer sticking tendency is highest at the bottom of the bed and lowest at the top. As a result, lumping of polymer granules usually starts near the bottom of the bed. For this reason there is a practical limit on the bed height of a solid phase polymerisation reactor. At sufficiently high flow velocity, polymer granules change their positions relative to each other (by sliding, for example), and are thereby prevented from forming lumps. Since the rate of changes of contact areas of polymer granules and the reduction in the bulk density of the bed increases with increasing granule velocity, polymer sticking tendency within the reactor decreases with increasing granule velocity. For every combination of reactor temperature, bed height, and particle size, there exists a minimum granule velocity necessary to prevent sticking. For any given size and shape of polymer granule, the minimum velocity for avoiding sticking increases with increasing temperature and bed height. Thus a higher velocity is required for a higher polymerisation temperature or greater bed height.

For instance, for a pilot scale moving-bed vertical cylindrical reactor according to the known prior art, which is usually no more than 5 meters high, granule velocity of less than 0.3 meter per hour can be used without polymer sticking. On the other hand, for commercial scale vertical reactors, with output for instance up to 300 metric ton/day and which are conventionally 18 to 22 meters high, a granule velocity of at least 2 meters per hour is generally required.

A well designed commercial scale solid phase polymerisation plant must be capable of continuously producing products of desired IV in compliance with the required specification at a sufficiently high throughput.

The currently used plants (i.e. Buehler, UOP-Sinco, Hosokawa-Bepex, Zimmer) use single or multiple vertical cylindrical reactors 10 to 30 meters in height. In those plants the reactor is operated at a temperature between 200° C. and 230° C. and a polyester granules moving velocity of 1.00 to 2.52 meters per hour. Within these ranges of temperature, bed height, and granule velocity, a most suitable combination of the three variables is chosen to produce product with the desired IV. Said conventional plants, today available, are capable of producing polyethylene terephthalate (PET) resin with an IV between 0.72 to 0.86 dl/g, using PET prepolymer with an IV between 0.55 to 0.65 dl/g. Said conventional plants can increase polymer IV by about 0.12 to 0.25 dl/g.

For some specific applications, e.g., PET with IV between 0.95 and 1.05 dl/g for manufacturing technical/commercial articles (luggage, cords, conveyor belts, etc.) or for tyre cords using PET prepolymer with a typical IV in the range between 0.55 and 0.65 dl/g, or for standard bottle applications where the initial IV of the prepolymer is 0.25-0.45 dl/g, it is however, necessary to increase IV by more than 0.25 dl/g. This can hardly be achieved and it often cannot be achieved in a conventional plant using vertical reactors.

In a conventional process, there are two ways to raise the product IV; namely, increasing the reactor temperature or increasing the reactor residence time of granules. The reactor residence time is constrained by bed height and granule velocity. It can be increased by either increasing the bed height or by decreasing granule velocity. Increasing the reactor diameter allows an increase in the throughput rate but not in residence time at constant granule velocity. On the other hand, if reactor temperature is raised to increase the end product IV, polymer sticking tendency will therefore increase. To prevent polymer sticking, bed height must be decreased or granule velocity increased. However, either measure reduces reactor residence time and offsets the effect of the temperature increase. Alternatively, increasing the reactor residence time either by increasing the bed height (assuming there is a sufficient reactor height) or by reducing the granule velocity results in increased polymer sticking tendency.

To prevent sticking, the reactor temperature must be lowered, again offsetting the effect of the increased residence time on the product IV.

These constraints limit the ability of conventional plants using vertical single or multiple reactors, to increase intrinsic polymer IV.

Similar situation it is encountered when an industrial scale plant with capacity above 360 metric tons per day has to be designed for conventional continuous solid phase polymerisation processes.

In fact, in a conventional process, there are two ways to reach high plant production capacity: again by increasing the reactor temperature or by increasing the product volume ("hold-up") in the reactor. As far as drawbacks due to the temperature increase are concerned, the same above described issues have to be considered. On the other hand, the product volume ("hold-up") of polyester granules in the reactor is constrained by bed height, reactor diameter and granule velocity. If the product volume ("hold-up") is increased by either increasing bed height or reactor diameter, or by decreasing granule velocity, polymer sticking tendency will increase. Thus, these constraints limit the maximum capacity of conventional solid phase polymerisation processes, which use one or more vertical cylindrical reactors.

Nowadays, growing polyester and PET demand has given rise to a need for solid-phase polymerisation processes by means of which it is possible to achieve a higher increase of polyester molecular weight and a higher production capacity, typically >300 metric tons/day on single plant.

The purpose of the present invention is therefore to provide a solid phase polymerisation process of polyester that allows to overcome the limitations of the processes known so far by permitting to achieve better results in term of increased intrinsic viscosity of the polyester.

A further purpose of the invention is therefore to provide a solid phase polymerisation process of polyester that allows to achieve higher production capacities.

In the solid phase polymerisation plants also the purge gas flow rate has to be just sufficient to effectively remove the reaction by-products. As a matter of fact, a gas excess results in higher costs both for its supply and for its regeneration and disposal.

Therefore, a further purpose of the invention is therefore to provide a solid phase polymerisation process of polyester that allows to reduce the costs due to the purge gas employment.

These and other purposes are achieved with the process according to the invention, as claimed in the attached claims.

SUMMARY OF THE INVENTION

Advantageously, the process according to the invention allows to achieve higher molecular weight increases of the treated polyester when compared with the ones achievable with the conventional processes of the known prior art, furthermore avoiding unwanted agglomeration phenomena and other side effects.

The process according to the invention further allows to achieve a high degree of plug flow ("plug flow") and, consequently a high homogeneity and uniformity of the final product.

Advantageously, moreover, the process according to the invention allows to achieve higher production capacities when compared with the plants exploiting the conventional processes. Always according to the invention is furthermore possible to advantageously achieve a reduction of energy consumption, thanks to the decreased ΔP required for the purge gas with respect to conventional processes.

The invention will be now described more in detail with particular reference to the attached drawing, provided by way of not limiting example, and illustrating a flow chart of the process according to the invention.

DESCRIPTION OF THE DRAWING

With reference to the attached FIGURE, a flow chart of a solid phase polymerisation process according to the invention is schematically represented.

DETAILED DESCRIPTION OF PREFERRED EMBODIMENTS OF THE INVENTION

Polyester prepolymer granules stored in a hopper 11 are fed from here to a crystalliser 13 where they are heated up to a suitable temperature to cause the crystallisation of the granules without sticking.

Preferably, the crystallisation step is carried out in a fluidised bed crystalliser 13 by utilising a gas flow rate sufficient to cause the polyester granules to be fluidised with or without mechanical vibration. To this purpose inert gas or air can be used. Crystallization can generally be accomplished at residence times in the range of about 2 to about 20 minutes and, preferably, from about 10 to about 15 minutes. In the case of polyethylene terephthalate resin, heating is achieved by fluidising medium (either air or inert gas) at temperatures in the range of about 140° C. to about 235° C. and preferably in the range of about 200° C. to about 225° C. Residence time to crystallize the polyester granules to the desired level depends on the crystallization temperature; low crystallization temperature requires longer crystallization time.

In general, polyethylene terephthalate prepolymer is crystallized to a crystallization degree corresponding to a density of at least about 1.37 g/cm$^3$. The polyester granules can also be crystallised by vapor treatment (see for example U.S. Pat. No. 4,644,049) or by high frequency energy field ranging from about 20 to about 300 MHz (see for example U.S. Pat. No. 4,254,253).

After being crystallised, granules may optionally be fed into a preheater using purge inert gas. The crystallised polyester granules can optionally be dried after exiting the crystalliser. However, drying it is not strictly necessary and it is less costly to polymerise "wet" polyester, as it is known from U.S. Pat. No. 3,718,621.

After crystallisation the polyester granules are solid-phase polymerised.

According to the invention at least one or first cylindrical, horizontal inclined, rotating around the central cylinder S axis reactor similar to a "rotary kiln" may be used, which will be hereinafter for simplicity abbreviated as "HCIRR" referenced in the FIGURE as 15.

Also according to the invention, said at least one or first HCIRR reactor can be one HCIRR reactor of a series of HCIRR reactors, i.e. when the plant has a plurality of HCIRR reactors in series. Also according to the invention, said single or multiple HCIRR reactor/s can be provided upstream and/or downstream of conventional vertical reactor/s in a so-called "mixed configuration", i.e. when the plant has a plurality of both conventional vertical and HCIRR reactors in series.

Owing to the configuration of the HCIRR reactors and in particular owing to their inclination by an a angle in the range 0.1° and 12°, preferably between 1° and 6° with respect to the horizontal line, the maximum polyester granules bed height is 4-5 meters. This in turn means very low compaction pressure if compared to conventional reactors, achieving thus the most important condition required to obtain either high molecular weight PET or to obtain high output in terms of metric tons per day in a single line solid phase polymerisation plant. Advantageously, the combination of the inclination and the rotation, preferably with a speed between 0.1 and 10 rpm of the HCIRR reactor 15 ensures proper flow from one end to the other of the reactor HCIRR 15 and provides to constantly renew the inter-granular contact areas so that polyester granules do not have a chance to creep into one another.

As the weight itself of the granules mass inside the reactor can not be ignored with respect to other forces acting as, for example the force of inertia, preferably the design and operating parameters of the reactor HCIRR 15 will be chosen so that the granules flow regime inside the reactor is characterised by a Froude Number $Fr=(\omega^2 \cdot R/g)$ comprised in the range of $1 \cdot 10^{-4}$-0.5; where $\omega$ is the angular velocity of the reactor; R is the internal radius of the reactor and g is the gravity acceleration=9.806 m/s$^2$.

This flow regime, named "rolling", is such that, when granules are submersed in the bed of solid, they behave as a rigid body and rotate at the same rotational speed of the HCIRR reactor, and, when they come at the surface of the solid bed, they slide on the surface itself. This solid flow regime is essential in order to have a true "plug flow" behaviour of the solid phase.

The crystallised (or crystallised and preheated) polyester granules are passed into the top of the only HCIRR reactor 15 (or in the first HCIRR reactor of a series of reactors HCIRR, when the plant has a plurality of HCIRR reactors in series) and pass through the HCIRR reactor (or the reactors) thanks to its inclination as well as its rotation.

The granule flow rate through the HCIRR reactor 15 is controlled by regulating discharge from the HCIRR reactor itself.

Polymerisation is conducted in a stream of purge inert gas. Purge, as flow, well below the turbulent is generally preferred so to prevent fluidisation and entrainment of polyester granules. Furthermore, when more HCIRR reactors are present in series the inert gas flow rate will normally be approximately equal. In said latter case, it is preferred that the rate in each HCIRR reactor not exceed 1.25 times the rate in any other reactor in a reactor series.

Preferably, furthermore, both in the case of a single HCIRR reactor or a HCIRR reactor series the purge gas passes through the HCIRR reactor 15 counter-current to the polyester granules flow direction. Although also a co-current with the granules direction inert gas flow can be used, this latter configuration proves to be less efficient and generally requires a higher gas flow rate.

The HCIRR reactor 15 can be of any design, with or without internal baffles, with or without external heating/cooling "jacket", with or without internal heating/cooling coil, that will allow the polyester granules to be maintained at the desired temperature and residence time to allow for removal of reaction by-products, as glycol, water and acetaldehyde.

Suitable purge gases for use in the process of this invention preferably include nitrogen, but also carbon dioxide, helium, argon, neon, krypton, xenon, air and certain industrial waste gases and combinations or mixtures thereof can be chosen.

Moreover, optionally, purge inert gas can be recycled to the reactor, after having been purified of organic impurities, preferably until reaching a level of organic impurities$\leq 100$ p.p.m. by weight ($CH_4$ equivalent).

In general the polymerisation temperature will be included in the range from just above the threshold polymerisation temperature to a temperature within a few degrees of the polymer sticking temperature (which may be well below the melting point of the polymer).

For example, when polymerising PET homopolymers, a temperature in the HCIRR reactor (or in the first HCIRR of the series, when a plurality of reactors is provided) within the range of about 170° C. to about 235° C. and preferably in the range of about 190° C. to about 225° C. is suitable. Temperatures about 205° C. to about 220° C. are preferred.

Modified PET copolymers containing from about 1 to about 3 mole percent isophthalic acid, a percentage based on total acids, are polymerised at about 5 to 8° C. lower temperatures. Such copolyesters are less crystalline and have a great attitude to stick at polymerisation temperatures.

After exiting the HCIRR reactor 15, the polyester granules, having now the required final intrinsic viscosity (0.20-0.30 dl/g higher than prepolymer one), are cooled in a cooling fluidised bed 17 till reaching temperature of about 50° C. to about 70° C., for storage and/or packaging.

In case the process comprises a series of HCIRR reactors, when the polyester granules exit the first HCIRR of the series, it is preferred to increase their temperature (it is however not to exclude that, at given conditions, rather than a temperature increase a temperature decrease between a reactor and the subsequent one is required). The temperature increase is accomplished in a preheater (accordingly the temperature decrease, if any, will be accomplished by a cooler). Said preheater can be any suitable device, such as a Thermascrew heater, a Torusdisc process, or a fluidised bed heater. It is preferred that the polyester granules be heated to a temperature that is about 2° C. to about 20° C. (more preferably about 5 to about 10° C.) higher than the temperature at which said granules exited the previous reactor. Higher temperatures can be employed in subsequent reactors in the reactor series. This is possible because of increased crystallinity and higher melting points that occur while the polyester moves through each subsequent HCIRR of the series.

After exiting the first HCIRR reactor or after the preheater; the polyester granules enter the subsequent HCIRR reactor through the top thereof. The second HCIRR reactor can be the same design as the first HCIRR and be also operated in the same manner as the first HCIRR, except for temperature.

After polymerisation in the second HCIRR reactor, the intrinsic viscosity of the polyester resin will have increased by at least about 0.20 dl/g and preferably at least 0.30 dl/g.

Said procedure can be repeated for each HCIRR reactor in a plant with a HCIRR reactor series. It is desirable that the polyester resin exiting from the last HCIRR reactor be cooled in a fluidised bed or a mechanically agitated heat exchanger. The cooler will cool the resin to a temperature of about 50° C. to about 70° C. for storage and/or packaging.

This process according to the invention provides greatly increased residence time, without increasing polyester granules bed height, thereby enabling higher increase in the polymer molecular weight and a higher size output in terms of metric tons per day in single line solid phase polymerisation plants, with respect to conventional plants, today available.

Moreover, this process according to the invention allows the use of progressively higher temperatures in subsequent HCIRR reactors, which therefore increases overall polymerisation rate with a parallel increase in process efficiency.

In conventional solid phase polymerisation processes, which use vertical reactors, the polyester granules being fed to the reactor must have a minimum degree of crystallization in the range of 35-50%, depending on solid phase polymerisation conditions and granules morphology/dimension, to ensure sticking-free operations.

According to the invention, due to the reduced polymer granules bed height, thus involving reduced granules compaction pressure, said minimum degree of crystallization of polyester granules is in the range of 0-70%, preferably 10%-30%, reducing therefore the requirement of crystallisation in the provided step upstream of the reactor.

Furthermore the invention will be advantageously applicable to any polyester which can be solid phase polymerised. The most common polyesters suitable for use in the invention have at least about 75 mole percent of their acid moieties provided by an aromatic dicarboxylic acid, such as terephthalic acid, isophthalic acid, or a naphthalenic dicarboxylic acid (preferably 2,6-) with the diol moieties provided by glycols such as ethylene glycol, butylene glycol, 1,4-dimethylol cyclohexane and the like or aromatic diols such as hydroquinone and catechol. Said polyesters can contain other dicarboxylic acids such as adipic acid, isophthalic acid, sebacic acid, and the like. Polyethylene terephthalate, polyethylene isophthalate, polyethylene naphthalate, and polybutylene terephthalate homopolymers are representative examples of such polyesters.

Blends of various polyesters can also be solid phase polymerised in the process according to the invention. The polyester prepolymers (amorphous starting polyesters) utilized in this invention can be made in any manner but are typically prepared by conventional melt phase polymerisation techniques. These polyester prepolymers have an initial starting IV of at least about 0.2 dl/g as measured in a 60:40 (by weight): phenol-1,1,2,2,-tetrachloroethane solvent system at a temperature of 30° C. The rate at which polyethylene terephthalate prepolymer can be solid state polymerised also depends on the carboxyl end group (i.e. —COOH) content of the prepolymer. Generally, prepolymers having a carboxyl end group content within the range of about 18% to about 40% achieve maximum solid state polymerisation rates. It is preferred for such prepolymers to have a carboxyl end group content within the range of about 24% to 33% (see for example U.S. Pat. No. 4,238,593). Suitable polyester prepolymers which can be solid state polymerized using my invention are comprised of one or more diacid components and one or more diol components. The diacid component in the polyesters are normally alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 2.2 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids will contain from 4 to 12 carbon atoms. Some representative examples of such alkyl dicarboxylic acids include glutaric acid, adipic acid, pimelic acid, and the like. The preferred diesters of alkyl dicarboxylic acids will contain from 6 to 12 carbon atoms. A representative example of such a diester of an alkyl dicarboxylic acid is azelaic acid. The preferred aryl dicarboxylic acids contain from 8 to 16 carbon atoms. Some representative examples of aryl dicarboxylic acids are terephthalic acid, isophthalic acid, and orthophthalic acid. The preferred diesters of aryl dicarboxylic acids contain from 10 to 18 carbon atoms. Some representative examples of diesters of aryl dicarboxylic acids include diethyl terephthalate, diethyl isophthalate, diethyl orthophthalate, dimethyl naphthalate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component of the polyester prepolymers is normally comprised of glycols containing from 2 to 12 carbon atoms, glycol ethers containing from 4 to 12 carbon atoms, and polyether glycols having the structural formula HO-(A-O)$_n$—H wherein A is an alkylene group containing from 2 to 6 carbon atoms and wherein n is an integer from 2 to 400. Generally, such polyether glycols will have a molecular weight of 400 to about 4000. Preferred glycols normally contain from 2 to 8 carbon atoms and more preferably from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, and 2,2,4,4-tetramethyl-1,3-cyclobutane diol. Some representative examples of polyether glycols that can be used include polytetramethylene glycol and polyethylene glycol.

Branched polyester prepolymers can also be solid state polymerised in the process of the present invention. Such branched polyesters normally contain branching agents which have three or more functional groups and preferably three or four functional groups. Reactive functional groups can be carboxyl groups or aliphatic hydroxyl groups. The branching agent utilized in such branched polyesters can optionally contain both carboxyl groups and hydroxyl groups. Examples of acidic branching agents include trimesic acid, trimellitic acid, pyromellitic acid, butane tetracarboxylic acid, naphthalene tricarboxylic acids, and cyclohexane-1,3,5-tricarboxylic acids. Some representative examples of hydroxyl branching agents (polyols) include glycerin, trimethylol propane, pentaerythritol, dipentaerythritol, 1,2,6-hexane triol, and 1,3,5-trimethylol benzene. Generally, from 0 to 3 percent of a polyol containing from 3 to 12 carbon atoms will be used as the branching agent (based upon the total diol component).

High strength polyesters which utilize at least one bis-hydroxyalkyl pyromellitic diimide in their diol component can also be solid state polymerised. The diol component in these polyesters will normally contain from 5 to 50 mole percent of one or more bis-hydroxyalkyl pyromellitic diimides and will preferably be comprised of from 10 to 25 mole percent of at least one bis-hydroxyalkyl pyromellitic diimide. The remaining portion of the diol component is comprised of additional copolymerizable diols.

Embodiment 1

In a first embodiment of the invention some experiments were conducted in a pilot plant comprising a feed hopper 11, a crystalliser 13, a reactor 15 and a cooler 17.

The crystalliser 13 and cooler 17 were fluid beds using respectively nitrogen and air as heat transfer and fluidisation medium.

The used reactor 15 is a HCIRR horizontal cylindrical inclined reactor of 1.0 meter inside diameter, 13 meters length, 2° of inclination with respect top the horizontal plane and rotating at a 1.4 rpm speed. As purge inert gas nitrogen was used flowing downwards counter-currently respect to polyester granules flow direction. Gas circuits of fluid bed crystalliser, of reactor 15 and of fluid bed cooler 17 were isolated by means of rotary "interlocks".

A polycondensation test in the solid phase was carried out using polyethylene terephtalate granules containing a percentage by weight of isophthalic acid of 2.0% and a normal DTA melting point of 253.0° C. Flow rate of polyester granules was 500 kg/h. The ratio between the mass flow rate of the purge gas passing through the reactor and mass of polyester granules was=0.95. The starting intrinsic viscosity was 0.60 dl/g. The acetaldehyde content was 75 p.p.m. Polyester granules temperature at the reactor inlet, as well as inside the reactor, was 212° C. and their average degree of crystallisation $X_c$ in the range of 39-40%. The polymer obtained had a final intrinsic viscosity of 0.82 dl/g keeping constant the temperature of the reactor. The average residence time of polyester granules in the reactor was 12 hours.

Embodiment 2

For this second example of the embodiment of the process according to the invention, all parameters of the test of the first embodiment were kept constant, except polyester granules temperature inside HCIRR reactor. The following four temperatures were used: 214°±0.5° C., 217°±0.5° C., 220°±0.5° C. and 223°±0.5° C. In all those tests the average residence time of polyethylene terephtalate granules inside HCIRR reactor has been equal to 12 hours. The final intrinsic viscosity of the solid phase polymerised PET was respectively: 0.839 dl/g, 0.866 dl/g, 0.895 dl/g and 0.932 dl/g.

In all four tests a steady uninterrupted flow of polymer granules was kept, with no sign of agglomeration or sticking of granules.

The same test was conducted on a conventional vertical cylindrical "moving bed" reactor with inside diameter=1.6 meters, bed height=8 meters, granules velocity=0.32 meters per hour. Same polyethylene terephtalate granules were employed, with same degree of crystallinity at reactor inlet.

The test run with reactor temperature equal to 216°±0.5° C. was successful and, in 12 hours of residence time of granules inside the prior art vertical "moving bed" reactor, it produced a product with final intrinsic viscosity=0.837 dl/g.

The test run with reactor temperature equal to 217°±0.5° C. suffered beginning of polyester granules agglomeration phenomena and appeared to be the limit of the system; a product with final intrinsic viscosity=0.858 dl/g was produced in a residence time of 12 hours, however high product non-uniformity was observed.

As soon as the temperature was increased to perform the test with reactor temperature equal to 220°±0.5° C., "marble-size" lumps were coming out the reactor, a positive sign of polymer sticking.

Therefore, it was apparent that the maximum allowable reactor temperature had been reached. The reactor temperature was reduced to 216° to prevent further polymer agglomeration and to run out the small lumps already formed inside the reactor. After 14 hours of operation at 216° C., the polymer lumps had completely disappeared from the reactor product and the product intrinsic viscosity stabilized at about 0.851 dl/g.

This illustrated embodiment clearly shows that conventional, vertical, cylindrical, "moving bed" reactor presents a maximum allowable reactor temperature and maximum attainable intrinsic viscosity with a fixed reactor, bed height and bed velocity. In this specific case, the maximum allowable reactor temperature was about 216° C. and the maximum attainable intrinsic viscosity was about 0.851 dl/g with a reactor bed height of 8 meters, a velocity of 0.32 meters per hour, using a prepolymed with an intrinsic viscosity of 0.60 dl/g.

From the above it will result evident that the process according to the invention allows to achieve a higher increase of the molecular weight of polyester as well as to operate at a temperature well above the ones used before with the conventional moving-bed processes, without sticking and other unwanted effects.

The invention claimed is:

1. A process for the solid phase continuous polymerisation of polyesters, comprising the steps of:
    preparing a mass of polyester prepolymer granules comprising at least one polyester;
    feeding said polyester prepolymer granules to a crystallizer and heating them to a temperature of about 140° C. to about 235° C. to cause the crystallization of the granules;
    feeding said crystallized granules into a generally horizontal, cylindrical, heated, first rotating reactor, said first reactor being slightly inclined downwardly from a feeding end thereof;
    producing a purge gas flow inside said first reactor to increase the intrinsic viscosity of said at least one polyester.

2. The process according to claim 1, wherein the polyester granules fed into said first reactor have a temperature in the range of 185-225° C.

3. The process according to claim 1, wherein the polyester granules fed into said first reactor have a temperature in the range of 180-230° C.

4. The process according to claim 1, wherein the polyester granules fed into said first reactor have a crystallisation degree ($X_c$) greater than 10%.

5. The process according to claim 1, wherein the polyester granules fed into said first reactor have a crystallisation degree ($X_c$) greater than 20%.

6. The process according to claim 1, wherein the polyester granules fed into said first reactor have a minimum crystallisation degree ($X_c$) in the range of 0-70%.

7. The process according to claim 1, wherein said purge gas is an inert gas or air.

8. The process according to claim 1, wherein said purge gas is air with a dew point less than −30° C.

9. The process according to claim 1, wherein the purge gas is a mixture of gases chosen from the group consisting of nitrogen, noble gases, carbon dioxide, carbon monoxide and oxygen, and wherein the oxygen content is less than 10% by weight.

10. The process according to claim 1, wherein said purge gas is a mixture of gases chosen from the group consisting of nitrogen, noble gases, carbon dioxide, carbon monoxide and oxygen, and wherein the oxygen content is less than 6% by weight.

11. The process according to claim 1, wherein the purge gas has been purified of organic impurities to a level less than or equal to 100 p.p.m, by weight ($CH_4$ equivalent) and is then recycled to the first reactor.

12. The process according to claim 1, wherein said at least one polyester is polyester having at least about 75% of its acid moieties provided by terephthalic acid.

13. The process according to claim 12, wherein the polyester has an IPA (Isophthalic Acid) content in the range of 1-20%.

14. The process according to claim 12, wherein the granules of polyester fed into said first reactor have an intrinsic viscosity in the range between 0.55 and 0.65 dl/g.

15. The process according to claim 12, wherein the granules of polyester fed into said first reactor have an intrinsic viscosity in the range between 0.25 and 0.75 dl/g.

16. The process according to claim 1, wherein said at least one polyester is PEN polyethylene naphthalate.

17. The process according to claim 1, wherein said at least one polyester is PBT polybutylene terephthalate.

18. The process according to claim 1, wherein the granules fed in the first reactor have a carboxyl end groups content in the range of 10-45%.

19. The process according to claim 1, wherein the granules are cube-shaped with volumes between 1 $mm^3$ and 125 $mm^3$.

20. The process according to claim 1, wherein the granules are spherical with a diameter between 1 mm and 5 mm.

21. The process according to claim 1, wherein the granules are extended cylinders of length less than 10 mm and circular or square cross-section having, respectively, a diameter or side less than 5 mm.

22. The process according to claim 1, wherein the polyester granules are pancake-like platelets of diameter less than 3 mm and thickness less than 3 mm.

23. The process according to claim 1, wherein the polyester granules have an irregular shape with a volume between 1 and 125 $mm^3$.

24. The process according to claim 1, wherein the mass of prepolymer crystallised granules is achieved by subjecting the polyester granules to a crystallisation step in a fluidised-bed crystallizer having at least one bed, said bed being fluidised by means of a gas flow sufficient to generate the fluidisation of the polyester granules with or without mechanical vibration.

25. The process according to claim 24, wherein said gases employed for the crystallisation are inert gases or air.

26. The process according to claim 24, wherein said crystallisation step is performed with a residence time selected from the group consisting of between 2 and 20 minutes and 10 to 15 minutes.

27. The process according to claim 1, wherein the granules are heated to cause the crystallisation up to temperatures between 200-225° C.

28. The process according to claim 1, wherein the polyester granules inside said first reactor are subjected to at least one of a solid phase polycondensation, drying, and dealdehydisation.

29. The process according to claim 1, wherein the intrinsic viscosity of the polyester is increased at least 0.35 dl/g.

30. The process according to claim 12, wherein the intrinsic viscosity of the polyester is increased at least 0.4 dl/g.

31. The process of claim 1, which allows a high degree of plug flow to yield high uniformity and homogeneity of the final product.

32. The process of claim 31 wherein the rotating reactor is at an angle of 0.1 to 12 degrees to the horizon and rotates at a speed of 0.1 to 10 rpm.

33. The process of claim 24 wherein the rotating reactor is at an angle of 0.1 to 12 degrees to the horizon and rotates at a speed of 0.1 to 10 rpm.

34. The process of claim 33, wherein the granules form a bed of granules in the rotating reactor with a maximum height of 4 to 5 meters.

35. The process of claim 34, wherein the granules internal of the bed behave as a rigid body and rotate at the same rate as the rotating reactor and when said particles are at the surface of the bed, slide at the surface and are subject to an inert purge gas flowing in a direction counter current to the flow of the granules.

36. The process of claim 35, which contain multiple reactors in series and in which the purge gas flow rate in any one reactor does not exceed the purge gas flow rate in any other reactor by 1.25 times.

37. The process of claim 36, wherein the temperature in the first reactor is from 205° C. to 220° C. and the temperature is progressively higher downstream in a second or further reactor.

38. The process of claim 37, which has a production output of greater than 300 metric tons per day of polyethylene terephthalate for beverage bottles.

39. The process of claim 34, wherein the degree of crystallization is from 10-30% when the granules enter the first rotating reactor.

40. The process of claim 2 further comprising the step of forming beverage bottles from said granules from said rotating reactor.

* * * * *